April 1, 1952   R. R. POST   2,591,196
LICENSE TAG HOLDER
Filed June 17, 1949
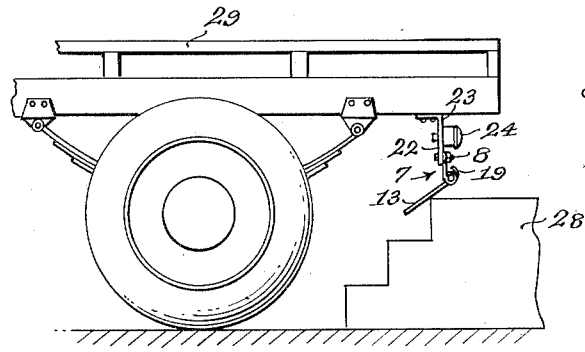
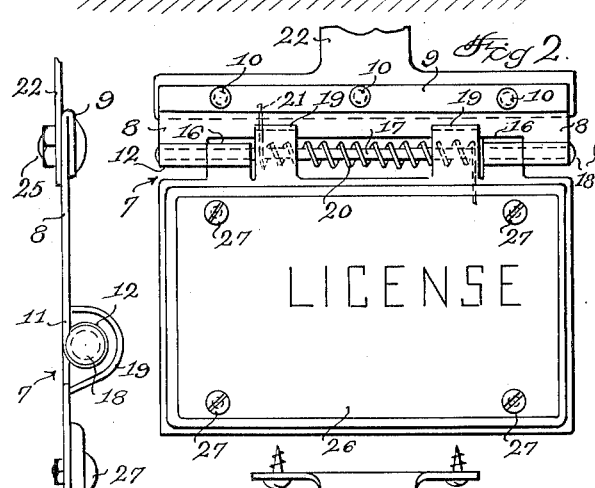
Inventor
Ralph R. Post
By John N. Randolph
Attorney

Patented Apr. 1, 1952

2,591,196

UNITED STATES PATENT OFFICE 2,591,196

LICENSE TAG HOLDER

Ralph R. Post, Waterbury Center, Vt.

Application June 17, 1949, Serial No. 99,803

1 Claim. (Cl. 40—125)

The invention relates to a holder for license tags or plates and is adapted for use on all forms of vehicles required to bear license tags or plates and primarily intended for use on trucks, tractors, trailers, semi-trailers and automobiles.

A primary object of the present invention is to provide an extremely durable license plate holder which will afford a backing and support for a license plate and by means of which the license plate will be yieldably supported on the vehicle so that the plate may swing toward the center of the vehicle to prevent its being bent or broken off as for example when employed on the back of a truck or trailer and in striking a loading platform in backing up the truck or trailer to said platform or when used on an automobile in striking or being struck by another automobile while parking.

Another and important object of the present invention is to provide a license plate holder which will return the license plate to an upright position after it has disengaged any obstruction or object and to cause it to thereby promptly resume its normal position in which position will be clearly visible.

Still a further object of the invention is to provide a license tag holder for securely supporting the license tag and for preventing bending or twisting thereof and which will additionally function to eliminate vibration and rattling of license tags and the resulting loosening of fastenings frequently causing the loss of a license tag.

Numerous other objects and advantages of the invention will hereinafter become more fully apparent from the following description of the drawing, illustrating a presently preferred embodiment of the invention, and wherein:

Figure 1 is a fragmentary side elevational view showing the rear portion of a truck or trailer with one form of the license tag holder mounted thereon and showing the license tag thereof as it will appear after striking an obstruction such as a loading platform;

Figure 2 is a front elevational view of a preferred form of the invention;

Figure 3 is a rear elevational view of the license tag holder shown detached;

Figure 4 is an edge elevational view, on an enlarged scale, showing a modified form of the invention;

Figure 5 is a fragmentary exploded perspective view of parts of the invention as illustrated in Figures 2 and 3, and Figure 6 is a front elevational view of the form of the invention as illustrated in Figure 4 but with the license tag shown removed.

Referring more specifically to the drawing and first with reference to the form of the invention as illustrated in Figures 1 to 3 and 5, the license plate or tag holder constituting the invention is designated generally 7 and includes an elongated, substantially rigid bar or plate 8 having an upper edge provided with a turned back or folded portion 9 for reinforcing said bar or plate 8 and which portion of double thickness is provided with longitudinally spaced openings 10. The end portions of the opposite, bottom edge of the bar or plate 8 are provided with integral depending extensions 11 which are outwardly rolled to form aligned barrel portions 12.

The license tag holder 7 also includes a license tag supporting plate 13 formed of relatively heavy gauge sheet metal which is of approximately the size of a conventional license tag and which is provided adjacent each corner thereof with an elongated opening 14, disposed longitudinally of the plate 13. One longitudinal edge of said plate 13, constituting the upper edge thereof, is provided with the integral lateral or upwardly projecting extensions 15 one of which is disposed near to but spaced from each end thereof and which extensions 15 are provided with outwardly rolled upper, free end portions forming barrels 16, corresponding to the barrels 12 and which are adapted to be positioned between said barrels 12 and in alignment therewith for receiving a rod 17 which extends longitudinally through the barrels 12 and 16 and the ends 18 of which are flattened, beyond the remote ends of the barrels 12 for retaining the rod 17 in engagement with said barrel portions 12 and 16. The rod 17 turnably engages the barrel portions 12 and 16 so that the license tag supporting plate can swing relatively to the mounting bar or plate 8. The supporting plate 13 is provided with two additional extensions 19 which are likewise formed integral therewith and project from said aforementioned upper edge. The extensions 19 are located between the barrel portions 16 and are longitudinally bowed outwardly or forwardly of the license tag holder 7 and are substantially semi-circular in shape, as best seen in Figure 4. Said extensions 19 have their free ends disposed to engage the forward side of the mounting plate or bar 8 when the plate 13 is disposed in the same plane as the plate 8, as seen in Figure 4, and for preventing said plate 13 from swinging in one direction beyond the plane of the plate or bar 8, so that the extensions 19 form stops for the license tag supporting plate 13, as will hereinafter become more fully apparent.

A coiled spring 20 is wound on the rod 17 between the barrel portions 16 and has one of its ends 21 bearing against the back side of the plate 13 and its other end 21 bearing against the back side of the mounting plate or bar 8, as best illustrated in Figure 3.

The license plate or tag holder 7 is adapted to be mounted on a conventional tag supporting bracket 22 of a rear or tail light bracket 23, which is illustrated in Figure 1 as being secured to and dependingly supported by a portion of the rear end of a truck body and which mounts a conventional rear or tail light 24, which is located above the license tag supporting bracket 22. The transversely extending license tag supporting bracket 22 is provided with the usual openings for receiving screw fastenings for normally attaching a license tag directly thereto. However, the upper rolled edge portion of the mounting plate 8 is positioned against the forward side of the bracket 22 with the openings 10 thereof registering with the openings, not shown, of the bracket 22 for receiving nut and bolt fastenings 25 by means of which the license tag holder is secured to the bracket 22. A conventional license tag 26 is placed against the forward side of the license tag supporting plate 13 so that the openings adjacent the corners of the tag 26 will register with portions of the elongated openings 14, which license tag openings are not shown, for receiving nut and bolt fastenings 27 for securing the tag 26 securely to the outer face or side of the plate 13, as clearly illustrated in Figures 2 and 4.

From the foregoing it will be readily apparent that the license tag holder 7 provides an improved and novel means for mounting a license tag which will permit the tag to yieldably swing inwardly with respect to a vehicle on which it is mounted, as illustrated in Figure 1, as for example when the vehicle, if a truck or trailer in backing up to a loading platform as seen at 28 moves sufficiently to cause the license tag to strike the loading platform, which would ordinarily cause the tag to be bent or broken off whereas with the mounting bracket 7 the license tag 26 with its supporting plate 13 will merely swing inwardly of the vehicle 29 to substantially a horizontal position without damaging the tag 26 and when the vehicle 29 moves away from the loading platform 28 the spring 20 will cause the supporting plate 13 and tag 26 to resume their normal position as seen in Figures 2 and 4 with the stops 19 limiting the counterclockwise swinging movement of the plate 13, as seen in Figures 1 and 4, beyond the position of Figure 4 wherein the plate 13 is disposed in the same plane as the plate 8. The spring 20 has sufficient strength to maintain the parts in their positions of Figure 4 to additionally prevent any rattling of the license tag 26 or the parts of the tag holder 7.

Figure 5 illustrates a slightly modified form of the invention wherein the license tag holder 7a has its mounting plate or bar 8a formed integral with the rear or tail light bracket 23a and replacing the conventional license tag bracket 22 thereof. The plate 8a is not provided with the fold 9 or the openings 10 but is provided with the depending extensions 11a terminating in barrel portions 12a, corresponding to the barrels 12 and which align with the barrel portions 16a of the license tag supporting plate 13a for receiving the rod or pivot pin 17a. As the other parts of the holder 7a correspond in all respects to the holder 7, a further description of the construction, operation and use of the holder 7a is considered unnecessary.

It will likewise be readily apparent that the license tag holders 7 or 7a could be mounted on the front of the vehicle 29 or of any other vehicle requiring license tags and in which case the license tag supporting plates 13 or 13a are disposed to swing inwardly or rearwardly of the vehicle to prevent damage to a license tag supported thereby in striking or being struck by another object or obstruction as in parking a vehicle. It will also be readily apparent that the license tag supporting plates 13 or 13a may be made in various sizes to accommodate license tags of different sizes; however, the elongated slots 14 will enable the plates 13 or 13a to accommodate substantially all ordinary license tags as now issued by the various states.

Various modifications and changes are contemplated and may obviously be resorted to, without departing from the spirit or scope of the invention as hereinafter defined by the appended claims.

I claim as my invention:

A license tag holder comprising a mounting plate adapted to be supported by and disposed stationary with respect to the body of a wheeled vehicle and in a vertical plane, said mounting plate having a lower edge adapted to be disposed substantially beneath an adjacent portion of the vehicle body, a substantially rigid license tag supporting plate, means swingably connecting said license tag supporting plate to the lower edge of the mounting plate, said license tag supporting plate being normally disposed in a depending position beneath the mounting plate, spring means carried by said connecting means engaging against and urging the license tag supporting plate to swing outwardly of the vehicle and relatively to the mounting plate, and stop means carried by the supporting plate and engaging said mounting plate to combine with said spring means for normally retaining the plates in substantially the same plane, said stop means comprising extensions of the upper edge of the license tag supporting plate, said extensions being outwardly bowed with respect to the license tag supporting plate and having free ends disposed to abut the forward side of the mounting plate when said plates are disposed in the same plane to limit outward swinging movement of the supporting plate relatively to the mounting plate, said supporting plate being restricted in its inward and upward swinging movement relatively to the mounting plate solely by the tension of said spring means.

RALPH R. POST.

REFERENCES CITED

The following references are of record in the file of this patent:

UNITED STATES PATENTS

| Number | Name | Date |
|---|---|---|
| 1,083,728 | Clement | Jan. 6, 1914 |
| 1,579,928 | Groesbeck | Apr. 6, 1926 |
| 1,600,887 | Kimbrough | Sept. 21, 1926 |
| 2,177,215 | Hodgkinson | Oct. 24, 1939 |
| 2,201,519 | Buehner | May 21, 1940 |